Nov. 21, 1939. B. H. KENNEDY 2,180,960
NIPPLE STRUCTURE
Filed July 26, 1938
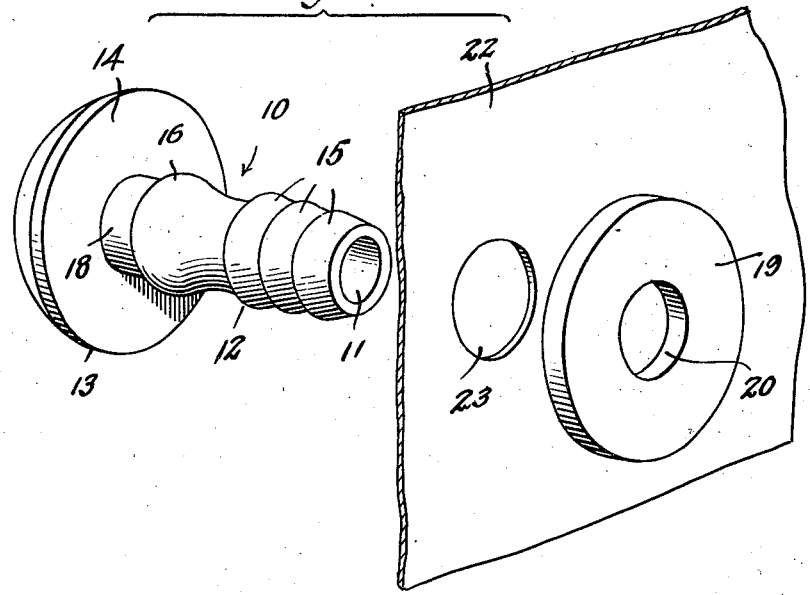
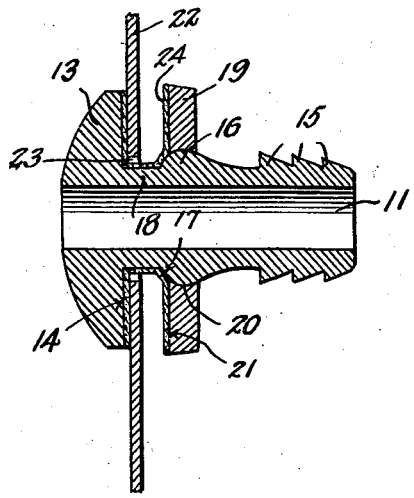
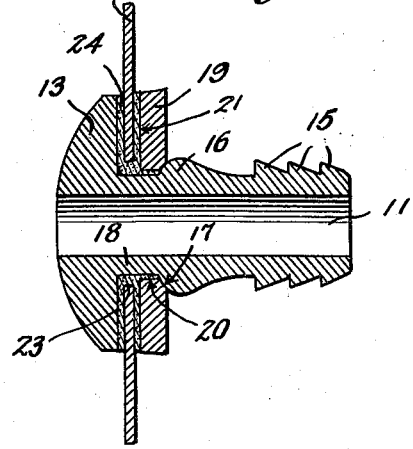
INVENTOR.
BENJAMIN H. KENNEDY
BY
Clarke + Ott
ATTORNEYS Patented Nov. 21, 1939

2,180,960

UNITED STATES PATENT OFFICE 2,180,960

NIPPLE STRUCTURE

Benjamin H. Kennedy, Pittsford, N. Y.

Application July 26, 1938, Serial No. 221,380

3 Claims. (Cl. 285—30).

This invention relates to nipples and has particular reference to an inlet or outlet nipple structure for anchoring the same to a liquid receptacle.

The invention has in view an inlet or outlet nipple structure which facilitates the assembling thereof with a liquid receptacle while insuring a durable liquid-tight connection.

The invention further comprehends a nipple structure for detachably connecting a hose to the flexible wall of a liquid receptacle and which nipple is so constructed and arranged that when assembled the parts thereof clampingly engage a portion of the wall of the receptacle therebetween so as to securely retain the same in position against accidental or unintentional displacement.

The invention further embodies a nipple structure including a pair of interfitting members having faces adapted to be disposed in confronting relation, one of which members is formed with a tubular portion protruding from the face thereof and the other of which members is apertured and radially expansible over the protruding portion of said other member to dispose the confronting faces of said members in contact with opposite surfaces of the wall of the receptacle so as to secure the same therebetween and to provide a liquid-tight joint.

The invention more particularly comprehends a nipple structure including a tubular shank having a headed end and a peripheral bead spaced from said head, an elastic apertured member adapted to be expanded over and contracted behind said head so as to dispose the same in confronting relation with said head for clampingly engaging a portion of the wall of the receptacle therebetween and a cementitious material for bonding said portion of the wall of the receptacle and said head and apertured member together.

With the foregoing and other objects in view reference is now made to the following specification and accompanying drawing in which there is illustrated the preferred form of the invention.

In the drawing:

Fig. 1 is a collective perspective view of the parts of the nipple structure in separated juxtaposition to each other and to a fragmentary portion of the wall of a liquid receptacle.

Fig. 2 is a longitudinal sectional view through the nipple structure and fragmentary portion of the wall of the receptacle illustrating the apertured member of the nipple structure as the same is being slid over the bead of the shank thereof.

Fig. 3 is a similar sectional view illustrating the nipple structure in fully applied position to the wall of the receptacle.

Referring to the drawing by characters of reference, the nipple structure includes a member 10 constructed of substantially rigid material such as hard rubber or the like and which member is provided with a longitudinally extending bore 11 therethrough defining a passageway for admitting liquid to or discharging the same from a liquid receptacle. The member 10 includes a shank 12 having a head 13 at one end thereof formed with its inner face 14 disposed substantially in a plane perpendicular to the axis of the shank.

The opposite end portion of the shank 12 is provided with a series of annular serrations 15 for receiving and frictionally retaining a tubular hose engaged thereover. Intermediate the head 13 and the serrations 15, the shank 12 is provided with a circumferential bead 16 of substantially arcuate shape in cross section tapering outwardly towards the serrations 15 and having a shoulder 17 tapering inwardly towards the head 13, and between which shoulder 17 and the head 13 the shank 12 is provided with a cylindrical neck portion 18 which is of a diameter corresponding approximately to the diameter of the outer end of the shank.

The nipple structure also includes a member 19 constructed of an elastic material, such as semi-vulcanized rubber, and having an aperture 20 therethrough of a size substantially the diameter of the neck portion 18 of the shank 12, and with a side face 21 disposed in a plane substantially perpendicular to the axis of the aperture 20. When in assembled position the member 19 is disposed with the opening 20 expanded and circumferentially seated on the shoulder 17 of the bead 16 and on the neck portion 18 adjacent the bead to thereby impinge the face 21 of the member 19 against the outer surface of the wall 22 of the receptacle adjacent the opening 23 and to clamp the same between the member 19 and the head 13 to produce the liquid-tight joint.

In assembling the nipple structure with the liquid receptacle, a cementitious material 24 may be applied to the surface of the shank 12 and the face 14 of the head 13, the face 21 of the member 19 and the opposite surfaces of the wall 22 of the liquid receptacle adjacent the inlet or outlet opening 23 thereof. The shank 12 of the member 10 is disposed in the opening 23 of the wall of the receptacle with the inner surface of the receptacle adjacent the said opening engaging the face 14 of the head 13. The member 19 is then applied to the shank 12 by sliding the same longitudinally thereover which effects a sufficient expansion thereof to enlarge the opening 20 as the member passes over the annular bead 16 with the face 21 disposed in confronting relation with the face 14 of the head 13 and into abutting relation with the outer surface of the wall of the receptacle adjacent the opening 23. The cementitious material 24 applied to the bead 16 acts as a lubricant to facilitate the sliding of the member 19 thereover and into its final assembled position in surrounding relation with the shoulder 17 and neck portion 18 of the shank 12. The cementitious material 24 is then permitted to harden to thereby connect and bond the wall of the receptacle surrounding the opening 23 and the nipple structure together.

What is claimed is:

1. A nipple structure for liquid receptacles having an opening in a wall thereof, said nipple structure including a tubular shank extending through said opening, a head at one end of said shank engaging the wall of the receptacle, a peripheral bead on said shank adjacent said head, and an apertured member of rubber-like material having a flat face disposed substantially perpendicular to the axis of said aperture, said member embracing the shank and compressed between the bead and the head with the said face disposed against the receptacle wall to resiliently clamp and seal the said wall between the head and apertured member.

2. A nipple structure for liquid receptacles having an opening in a wall thereof, said nipple structure including a tubular shank extending through said opening, a head at one end of said shank engaging the wall of the receptacle, a peripheral bead on said shank adjacent said head, and an apertured normally expanded compressible member of rubber-like material having a flat face disposed substantially perpendicular to the axis of said aperture, said member being disposed upon the inner curved portion of said bead and on the shank between the bead and the head and impinging against the outer face of the wall of the receptacle adjacent the said opening therein to clamp the same between the head and the apertured member.

3. A nipple structure for liquid receptacles having an opening in a wall thereof, said nipple structure including a tubular shank extending through said opening, a head at one end of said shank disposed in confronting relation with the wall of the receptacle, a peripheral bead on said shank adjacent said head, an apertured normally expanded compressible member having a flat face disposed substantially perpendicular to the axis of said aperture, said member embracing the shank and compressed between the bead and the head with the said face disposed in confronting relation with the outer surface of the receptacle wall to clamp and seal the said wall between the head and apertured member, and a cementitious material bonding the head, the wall of the receptacle adjacent the opening therein, and the apertured member together.

BENJAMIN H. KENNEDY.